US006785414B1

(12) United States Patent
McStravick, III et al.

(10) Patent No.: US 6,785,414 B1
(45) Date of Patent: Aug. 31, 2004

(54) SYSTEM AND METHOD FOR ESTABLISHING AN AGGREGATE DEGREE OF BRIGHTNESS FOR EACH PRIMARY COLOR TO CREATE A COMPOSITE COLOR DIGITAL IMAGE

(75) Inventors: Arnold W. McStravick, III, McLean, VA (US); Louis F. Marek, Jr., Germantown, MD (US); Kevin W. Ryan, Silver Spring, MD (US)

(73) Assignee: Media Cybernetics, Inc., Silver Spring, MD (US)

( * ) Notice: Subject to any disclaimer, the term of this patent is extended or adjusted under 35 U.S.C. 154(b) by 649 days.

(21) Appl. No.: 09/671,113

(22) Filed: Sep. 28, 2000

(51) Int. Cl.[7] ................................................. G06K 9/00
(52) U.S. Cl. ...................... 382/162; 358/520; 348/362
(58) Field of Search ............................... 348/360–371; 355/68–77; 382/162–180; 396/231–242; 358/518–523

(56) References Cited

U.S. PATENT DOCUMENTS

| 4,833,536 | A |   | 5/1989 | Okino et al. ................. 358/228 |
| 5,093,716 | A |   | 3/1992 | Kondo et al. .................. 358/41 |
| 5,579,156 | A |   | 11/1996 | Faltermeier et al. ........ 359/363 |
| 5,668,597 | A |   | 9/1997 | Parulski et al. |
| 5,724,456 | A | * | 3/1998 | Boyack et al. ............... 382/169 |
| 5,774,747 | A |   | 6/1998 | Ishihara et al. ............... 396/61 |
| 5,815,159 | A |   | 9/1998 | Katayama et al. |
| 5,917,556 | A |   | 6/1999 | Katayama |
| 5,966,175 | A | * | 10/1999 | Inoue .......................... 348/364 |
| 6,061,091 | A | * | 5/2000 | Van de Poel et al. ....... 348/364 |
| 6,456,323 | B1 | * | 9/2002 | Mancuso et al. ............ 382/284 |
| 6,486,915 | B2 | * | 11/2002 | Bell et al. .................... 348/362 |
| 6,545,743 | B1 | * | 4/2003 | Luo et al. .................... 382/195 |
| 6,563,543 | B1 | * | 5/2003 | Doron ......................... 348/362 |
| 6,570,620 | B1 | * | 5/2003 | Yoshimura et al. .......... 348/362 |
| 6,583,820 | B1 | * | 6/2003 | Hung .......................... 348/362 |

OTHER PUBLICATIONS

"Media Cybernetics® The Imaging Experts: Hot Links," at http://www.mediacy.com/, 1 page (last visited Jun. 22, 2000).

"Image–Pro® Plus The Proven Solution™: Fast, Accurate, & Easy to Use Image–Pro Plus From Media Cybernetics The Leader in Image Analysis," at http://www.mediacy.com/ippage.htm, 7 pages, (last visited Jun. 22, 2000).

(List continued on next page.)

*Primary Examiner*—Jingge Wu
(74) *Attorney, Agent, or Firm*—Sterne, Kessler, Goldstein & Fox P.L.L.C.

(57) ABSTRACT

A system and method for establishing an aggregate degree of brightness for each primary color to create a composite color digital image. One of a plurality of primary colors is selected. A color digital image is captured with a color digital camera. The aggregate degree of brightness for the selected primary color is determined. The determined aggregate degree of brightness for the selected primary color is compared with the desired degree of brightness for the selected primary color. If the determined aggregate degree of brightness is not within a tolerance band surrounding the desired degree of brightness, then an adjustment is made to an exposure time controller of the color digital camera. This process is repeated until the determined aggregate degree of brightness is within the tolerance band surrounding the desired degree of brightness. If the determined aggregate degree of brightness is within the tolerance band surrounding the desired degree of brightness, then photosite values for the selected primary color are copied into corresponding pixels in a buffer. The process is repeated for each remaining primary color.

29 Claims, 6 Drawing Sheets

OTHER PUBLICATIONS

"Image–Pro® Express The Proven Solution™: Low Cost Image & Capture Management From the Leader in Imaging Software Solutions!" at http://www.mediacy.com/ipe.htm, 4 pages, (last visited Jun. 22, 2000).

"CoolSNAP–Pro Digital Kit An Integrated Solution: Cool-SNAP–Pro digital Capture Kits," at http://www.mediacy.com/kits/coolsnappro.htm, 4 pages, (last visited Jun. 22, 2000).

"Scope–Pro® Plug–In An Image–Pro® Solution: Automate the Movement of your Microscope and/or Stage," at http://www.mediacy.com/scopepg.htm, 4 pages, (last visited Jun. 22, 2000).

"Gel–Pro® Imager Thr Integrated Solution™: From Images to Answers™: The Total Solution for Electrophoresis Image Analysis," at http://www.mediacy.com/kits/qpimager.htm, 4 pages, (last visited Jun. 22, 2000).

"General Information," at http://www.phoretix.com/imcap/image.htm, 2 pages, (last visited Jun. 22, 2000).

"CCD–Chip Architecture," at http://www.uio.no/~walmann/Publications/Master/node24.html, 3 pages, (last visited Jun. 23, 2000).

"Camera Control Software," at http://www.uio.no/~walmann/Publications/Master/node26.html, 2 pages, (last visited Jun. 23, 2000).

"Steve's Digicams—Digital Camera Dictionary," at http://www.steves–digicams.com/digi_dictionary.html, 12 pages, (last visited Jul. 5, 2000).

"Contents," at http://www.shortcourses.com/choosing/contents.htm, 2 pages, (last visited Jun. 23, 2000).

"A Short Course in Choosing a Digital Camera Introduction," at http://www.shortcourses.com/choosing/00.htm, 2 pages, (last visited Jun. 23, 2000).

"A Short Course in Choosing a Digital Camera: 1. What is a Digital Photograph?" at http://www.shortcourses.com/choosing/01.htm, 3 pages, (last visited Jun. 23, 2000).

"A Short Course in Choosing a Digital Camera: 2. Why go Digital?" at http://www.shortcourses.com/choosing/02.htm, 7 pages, (last visited Jun. 23, 2000).

"A Short Course in Choosing a Digital Camera: 3. How a Digital Camera Works," at http://www.shortcourses.com/choosing/03.htm, 5 pages, (last visited Jun. 23, 2000).

"A Short Course in Choosing a Digital Camera: 4. Types of Digital Cameras," at http://www.shortcourses.com/choosing/04.htm, 5 pages, (lasted Jun. 23, 2000).

"A Short Course in Choosing a Digital Camera: 5. Image Sensors," at http://www.shortcourses.com/choosing/05.htm, 10 pages, (last visited Jun. 23, 2000).

"What's New at IPS," at http://www.imageprocsol.com/whatsnew.htm, 2 pages, (last visited Jun. 22, 2000).

"Inovision Corporation Your Analytical Imaging Source: Roper Scientific's CoolSNAP Cooled Color Digital CCD Camera, " at http://www.inovis.com/coolsnap.html, 1 page, (last visited Jun. 22, 2000).

"Cooled CCD Color Digital Camera FAQ," at http://www.diaginc.com/faq.htm, 13 pages, (last visited Jun. 22, 2000).

"Diagnostic Instruments–Homepage," at http://www.diaginc.com/, 1 page, (last visited Jun. 22, 2000).

"Diagnostic Instruments–"SPOT–RT" Digital Cameras for Microscopes," at http://www.diaginc.com/spotrt.htm, 1 page, (last visited Jun. 22, 2000).

"Diagnostic Instruments—"SPOT–RT" Digital Camera for Microscopes," at http://www.diaginc.com/spotinsight.htm, 1 page, (last visited Jun. 22, 2000).

"SPOT 2e Dgital Camera for Microscopes," at http://www.diaginc.com/spot.htm, 4 pages, (last updated Jun. 13, 2000).

"COOKE Corp–Technical Articles," at http://www.cookecorp.com/techart/solidstate.htm, 6 pages, (last visited Jun. 22, 2000).

"COOK Corp–Image Gallery," at http://www.cookecorp.com/photo/index.html, 1 page, (last visited Jun. 22, 2000).

"COOKE Corp–Image Gallery: Bio–Imaging and Life Science," at http://www.cookecorp.com/photo/bioimaging.html, 1 page, (last visited Jun. 22, 2000).

"COOKE Corp–Image Gallery: Ballistic," at http://www.cookecorp.com/photo/ball.html, 2 pages, (last visited Jun. 22, 2000).

"COOKE Corp–Image Gallery: Spray and Particle," at http://www.cookecorp.com/photo/spraypart.html, 2 pages, (last visited Jun. 22, 2000).

"COOKE Corp–Image Gallery: General High Speed," at http://www.cookecorp.com/photo/highspeed.html, 1 page, (last visited Jun. 22, 2000).

"MCID Components: Imaging Research, Inc.," at http://www.imaging.brocku.ca/products/MCID_components.htm, 8 pages, (last visited Jun. 22, 2000).

"Introduction to Image Capture," at http://www.phoretix.com/imcap/im_intro.htm, 1 page, (last visited Jun. 22, 2000).

"CCD Cameras," at http://www.phoretix.com/imcap/ccd.htm, 1 page, (last visited Jun. 22, 2000).

"Scanners," at http://www.phoretix.com/imcap/scanners.htm, 1 page, (last visited Jun. 22, 2000).

"Radiation & Fluorescence Capture," at http://www.phoretix.com/imcap/radiatio.htm, 1 page, (visited Jun. 22, 2000).

"Roper Annual Review," at http://www.roperind.com/annualreport1999/annualreview.htm, 8 pages, (last visited Jun. 22, 2000).

"Roper Scientific CoolSnap: Capture High Resolution Color Fluorescence Images Fast," at http://www.eis–image.com/rsp–coolsnap–body.html, 1 page, (last visited Jun. 22, 2000).

"CoolSnap Specification," at http://www.imageprocsol.com/datasheets/cameras/coolsnap.htm, 1 page, (last visited Jun. 22, 2000).

"CoolSNAP . . . the ideal color camera for fluorescence microscopy," at http://www.photometrics.de/coolsnap.html, 1 page, (last visited Jun. 22, 2000).

"Photometrics GmbH Beyond Imaging CoolSnap $fx$: Monochrome, 12–bit digitization at 20 MHz," http://www.photometrics.de/coolsnapfx.html, 2 pages, (last visited Jun. 22, 2000).

"High–Performance Solutions for Biological Imaging," at http://www.photometrics.de/bioimge2000.html, 1 page, (last visited Jun. 22, 2000).

* cited by examiner

SYSTEM AND METHOD FOR ESTABLISHING AN AGGREGATE DEGREE OF BRIGHTNESS FOR EACH PRIMARY COLOR TO CREATE A COMPOSITE COLOR DIGITAL IMAGE

BACKGROUND OF THE INVENTION

1. Field of the Invention

The present invention relates generally to control of exposure times of color digital cameras.

2. Discussion of the Related Art

The old adage that "a picture is worth a thousand words" has taken on a heightened degree of meaning in the wake of the development of digital image processing technologies. Digital image processing methods enable pictorial data to be manipulated in ways that enhance the means by which humans can interpret this data. Initially, this capability gave rise to an interest in transforming images, stored via traditional media products, into digital formats. Typically, this has been performed by use of an image scanner. More recently, efforts have focused on methods of directly creating digital images. Digital cameras are an end product of these efforts.

Unlike traditional film cameras, digital cameras use a solid-state device called an image sensor to capture the image. Image sensors are semiconductor chips containing a grid of hundreds of thousands to millions of photosensitive diodes called photosites. Each photosite corresponds to a single pixel of the captured image. Light energy entering the digital camera impinges on the image sensor causing the semiconductor material to release electrons that are captured by the photosites. In this way, each photosite records, as an electric charge, the accumulation of light energy that impinges on it. As a photosite is exposed to light for longer periods, increasing amounts of light energy reach it, and a greater electric charge is stored. The closing of the shutter initiates a process whereby the charge at each photosite is measured and converted to a digital representation. All photosites, taken in aggregate, store a digital mapping of the image that can be used to reproduce it.

While recording the amount of light energy that reaches them, photosites do not distinguish this light energy by its different wavelengths. Therefore, photosites are, by themselves, insensitive to color. Digital cameras perceive color by use of color filters placed between the impinging light and the photosites. A color filter passes light energy at or near the wavelength corresponding to the color of the filter and attenuates light energy outside this band. This has the relative effect of favoring the accumulation, on a photosite, of light energy at wavelengths at or near the wavelength corresponding to the color of the filter. This allows digital cameras to leverage a natural phenomenon of visible light. All of the colors of visible light can be realized through various combinations of the three primary colors of red, green, and blue. Therefore, it is possible, by using filters set to these three primary colors, to capture the various hues of an image and reproduce the actual coloring of the scene by reassembling the various filtered components.

Color filtering typically occurs by one of two methods. One process requires taking a series of exposures in which a different colored filter is used with each iteration. These filters can be individual color filters or a composite unit that can be controlled to filter different colors. Composite filters using liquid crystal display technology are commonly used. Light passing through a given filter reaches each of the photosites on the image sensor. This facilitates a high degree of accuracy when the image is reproduced. However, this high degree of accuracy depends on the ability to hold the objects in the image stationary for the time necessary to record the three images and change the filters between each exposure. A modification of this approach involves using a digital camera with three image sensors. A different colored filter is used for each sensor so that all three primary colors of the image are captured in a single exposure. Digital cameras with three image sensors are relatively expensive.

Another alternative method involves affixing an individual filter to each photosite such that the overall image sensor appears as a mosaic. The Bayer pattern is a typical arrangement of photosite filters. Empirically derived to match the perceptive qualities of the human eye, it uses twice as many green filters as blue or red. Using filters affixed to and covering individual photosites allows all colors of an image to be captured in a single exposure. True colors are divined from the three primary colors by use of a comparison algorithm. The degree of accumulated energy recorded at a given photosite is compared with the levels stored at surrounding photosites to determine the true color of the image at the position corresponding to the given photosite. This is the color that is rendered when the image is reproduced. Owing to the large number of photosites, performance of the algorithm requires a considerable amount of processing time.

While this approach allows all colors of an image to be captured in a single exposure, the fidelity of the reproduction suffers from the fact that each primary color is recorded by only a portion of the total number of photosites. Accuracy is also impeded by reliance on the interpolation algorithm to estimate the true color of a given location on the image. Additionally, a certain amount of the accumulated electric charge at a given photosite results from electrons released from the semiconductor material due to thermal energy. The interpolation algorithm can be limited in its ability to correct for variations, among the photosites, in this thermal noise.

Image sensors traditionally have used charge-coupled devices (CCDs) for their photosites. Development of this technology has enabled the production of high quality image sensors. More recently however, image sensors have been made using complementary metal oxide semiconductor (CMOS) technology. With CCD technology, after an image is captured, stored charges are transferred from the photosites row by row to a readout register for subsequent processing by devices on other chips. As charges stored in the row nearest the readout register are transferred to it, charges stored in the next adjacent row are transferred to the row nearest the readout register. Charges stored in all other rows are likewise transferred to their respective adjacent rows nearest the readout register. The charges on each row are "coupled" to those on the adjacent row so that when one row moves, the next also moves to fill the vacated photosites.

As a category of electron devices, CCDs have limited applications. They are fabricated on wafers using relatively expensive processes at foundries that specialize in their production. In contrast, CMOS technology is widely used for chips supporting a variety of electronic products. Therefore, use of CMOS allows manufacturers to enjoy tremendous economies of scale and to reduce their manufacturing expenses substantially. Additionally, development of CMOS processing technologies has realized the manufacture of wafers with high yields of useable chips, further reducing costs. Also, image sensors made from CMOS can include processing circuits on the same chip. Yet, while CMOS technology offers several advantages over CCDs, fabrication of image sensors from CMOS is still in its early stages of development and CMOS imagers do not yet have the quality of CCD sensors.

Digital cameras offer several advantages over other imaging technologies. With a digital camera, one can immediately view the captured image on a screen, transfer the image in a digital format via a host of communications technologies, display the image via a variety of media, edit images with digital processing techniques, save the costs of buying and developing film, reduce the use of toxic chemicals used in traditional photography, and ergonomically configure the design of the camera for use with other equipment, such as a microscope. With digital image processing, images can be cropped to emphasize specific portions, expanded or reduced in size, altered for brightness, blended with other images, or filtered to sharpen or blur outlines of objects or create a special effect. While it is possible to extract a still image from a videotape using a frame grabber, images created with digital cameras have higher degrees of resolution and are less likely to deteriorate during duplication or due to age. Finally, because digital imaging is not constrained to standard aspect ratios, digital cameras, outfitted with the right interface boards, are readily adapted for use in systems where they can be configured to match the optical characteristics of other pieces of equipment.

Because of these advantages, digital cameras have been sought to be used to document scientific work products in such fields as biochemistry, cell biology, pathology, genetics, forensics, geology, metallurgy, inspections of electron devices, quality control applications, and the like. The high degree of resolution and ease of configuration have made digital cameras a particularly desirable tool for capturing microscopic images. Early uses in this field revealed difficulties in coupling digital cameras to microscopes or endoscopes. These difficulties have stemmed not so much from the mechanical coupling of the devices as from the complications that arise when lenses, cables, and interface boards are added to the process.

Fortunately, interest in this use has been sufficiently large enough to warrant industry response to these problems. Manufacturers of digital cameras have been quick to develop turnkey systems that combine a digital camera, cabling, and interface boards, all designed for use with a microscope. The cameras themselves often integrate an image sensor, an analog-to-digital converter, and a processor into a single unit. Some packages even include software to aid the user in configuring the parameters, operating the camera, and processing the images. Software tailor-made by the manufacturer can exploit the strengths of the digital camera system while diminishing its weaknesses. The software can also automate several basic functions so that end users need not familiarize themselves with unnecessary aspects of the functioning of the system. Furthermore, software can be used to customize operations of the system for specific applications.

The ability to capture microscopic images in digital form is especially useful for realizing the full potential of array technology. By supporting simultaneous examination of up to thousands of samples, each sample having a diameter on an order of magnitude of 200 microns, array technology has dramatically expanded the ability of researchers to perform a variety of biotechnological operations. Measurement and analysis of signals emitted from an array of objects usually involves examination of an image of the array. Typically, samples are labeled by use of fluorescent dyes or radiolabels. The labeled samples are excited and a detector system captures an image of the emitted energy. Accuracy of subsequent signal analysis is heavily dependent on the parameters of the detector system and its ability to reproduce faithfully the image of the array. Signals can be measured for absolute intensities or, in the case where different colored dyes are used to detect the degree of presence of different compounds, for ratios of intensities within specific frequencies.

The use of different colored fluorescent dyes and the importance of accurately measuring their intensities are characteristics that lend themselves to the methods by which digital cameras can be made to distinguish different colors. To date, the bulk of developmental activity regarding the display of colors on digitally reproduced images has focused on accurately integrating individual exposures filtered to highlight the primary colors of red, green, and blue. What has been needed in the art is a means to control, selectively, the highlighting of these colors on a digital image so that users can better extract the signals conveyed by the intensities or patterns of a given color and better attenuate the noise embodied as other colors.

SUMMARY OF THE INVENTION

The present invention provides a system and method for establishing an aggregate degree of brightness for each primary color to create a composite color digital image. The present invention is designed to function with different types of color digital cameras. Color digital cameras can be designed to use one or more image sensors and a variety of filtering mechanisms and configurations. Furthermore, image sensors can be fabricated using different technologies. To create a composite color digital image in which the aggregate degree of brightness for each primary color is set to a desired level; the present invention processes each color individually. Therefore, the present invention takes a series of exposures in order to capture all of the colors.

One of a plurality of primary colors is selected. A color digital image is captured with a color digital camera. The aggregate degree of brightness for the selected primary color is determined. In a preferred embodiment, the aggregate degree of brightness is determined by preparing a histogram of the values stored in those photosites corresponding to the selected primary color. Where filtering is accomplished by use of individual filters affixed to and covering each photosite on the image sensor, those photosites corresponding to the selected primary color are identified by the pattern of the filter. In this case, the histogram is prepared using only the values stored in the identified photosites. Otherwise, where filtering is accomplished by use of filters that cover the entire image sensor, all photosites are used to capture each color. In this case, the histogram is prepared using the values stored in all the photosites.

The determined aggregate degree of brightness for the selected primary color is compared with the desired degree of brightness for the selected primary color. If the determined aggregate degree of brightness for the selected primary color is not within a tolerance band surrounding the desired degree of brightness for the selected primary color, then an adjustment is made to the exposure time controller of the color digital camera. If the determined aggregate degree of brightness for the selected primary color is less than the lower value of the tolerance band surrounding the desired aggregate degree of brightness for the selected primary color, then the exposure time controller of the color digital camera is set so as to increase the exposure time of the color digital camera. If the determined aggregate degree of brightness for the selected primary color is greater than the upper value of the tolerance band surrounding the desired aggregate degree of brightness for the selected primary color, then the exposure time controller of the color digital camera is set so as to decrease the exposure time of the color digital camera. The process of capturing a color digital image, determining its aggregate degree of brightness for the selected primary color, comparing the determined aggregate degree of brightness with a desired aggregate degree of brightness, and adjusting the exposure time controller is repeated until the determined aggregate degree of brightness for the selected primary color is within the tolerance band surrounding the desired degree of brightness for the selected primary color.

If the determined aggregate degree of brightness for the selected primary color is within the tolerance band surrounding the desired degree of brightness for the selected primary color, then photosite values for the selected primary color are copied into corresponding pixels in a buffer. The process is repeated for each remaining primary color, thereby creating a composite color digital image in which the aggregate degree of brightness for each primary color is set to a desired level.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

The preferred embodiment of the invention is described with reference to the figures where like reference numbers indicate identical or functionally similar elements. Also in the figures, the left most digit of each reference number identifies the figure in which the reference number is first used.

DETAILED DESCRIPTION OF THE PREFERRED EMBODIMENTS

Nomenclature

Figure 1:
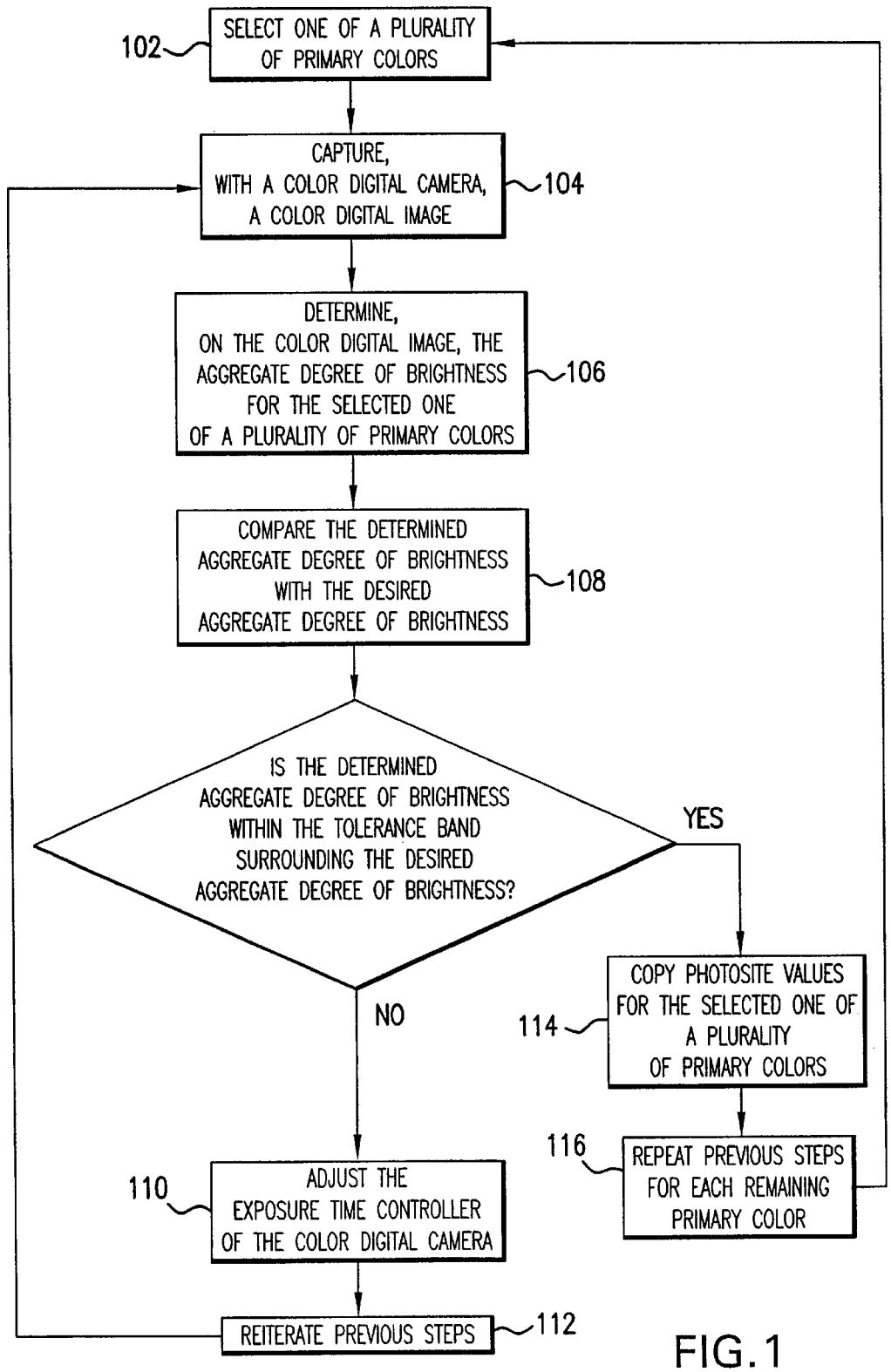
FIG. 1 is a high level operational block diagram of a preferred embodiment of the present invention.

The present invention provides a system and method for establishing an aggregate degree of brightness for each primary color to create a composite color digital image.

An "digital camera" is an apparatus for recording a visual representation of an image in a digital format. Often the digital camera is said to "capture" the image. In a digital format, "digital image processing" methods enable pictorial data to be manipulated in ways that enhance the means by which humans can interpret this data.

A digital camera captures an image on an "image sensor." An image sensor is a semiconductor chip containing a grid of photosensitive diodes called "photosites". Light energy entering the digital camera impinges on the image sensor causing the semiconductor material to release electrons that are captured by the photosites and held as a stored electric charge. A digital camera uses an "exposure time controller" to determine the amount of light that enters the digital camera for a specific exposure.

As a photosite is exposed to light for longer periods, increasing amounts of light energy reach it, and a greater electric charge is stored. When the recorded image is reproduced, this greater electric charge is rendered as a more intense level of "brightness" at the pixel corresponding to the photosite. Because brightness at a pixel on the reproduced image is a function of, among other parameters, the length of time that the image sensor is exposed to light, the brightness at a pixel on the reproduced image can be different from the actual brightness at the corresponding location on the object in the captured image.

All photosites, taken in aggregate, store a digital mapping of the image that can be used to reproduce it. The reproduced image will have an "aggregate degree of brightness" corresponding to the average of the values stored at the photosites. This aggregate degree of brightness can be determined by preparing a "histogram", a distribution plot of the number of photosites storing a particular value over the range of stored values.

The location of each photosite on the image sensor corresponds to the location of a "pixel", a picture element, on the reproduced image. A "pixel" also refers to a storage element in a memory bank designed specifically to store pictorial data. This special memory bank is referred to as a "buffer". The location of each photosite on the image sensor corresponds to the location of a "pixel" in the buffer. Each pixel in the buffer consists of a certain number of binary digits, or "bits". Typically, within each pixel, bits are further segregated by reserving a set of bits to represent values corresponding to each of three "primary colors": red, green, and blue. Because all of the colors of visible light can be realized through various combinations of the three primary colors, storing values for each primary color at each pixel allows the reproduced digital image to exhibit the true colors of the captured image.

While recording the amount of light energy that reaches them, photosites do not distinguish this light energy by its different wavelengths. Therefore, photosites are, by themselves, insensitive to color. Digital cameras perceive color by use of "color filters" placed between the impinging light and the photosites. A color filter passes light energy at or near the wavelength corresponding to the color of the filter and attenuates light energy outside this band. Color filtering can be accomplished either by covering the image sensor with individual color filters or a composite unit that can be controlled to filter different colors or by covering individual photosites with color filters. Composite unit color filters can be made using "liquid crystal display" technology. When color filters are affixed to individual photosites, the color filters form a pattern such that the overall image sensor appears as a mosaic. The "Bayer mosaic filter" is a common pattern. Depending on the number of image sensors used and the mechanisms and configurations of color filtering, different algorithms can be used to reconstruct the true colors of the captured image so that the reproduced image is a "composite color digital image." A digital camera configured to capture a "color digital image", of one or more colors, is a "color digital camera".

Current image sensors are made using "charge-coupled device" ("CCD") technology or "complementary metal oxide semiconductor" ("CMOS") technology. CCD and CMOS technologies are well known in the semiconductor art. After an image is captured on a CCD image sensor, stored charges are transferred from the photosites row by row to a readout register for subsequent processing by devices on other chips. The charges on each row are "coupled" to those on the adjacent row so that when one row moves, the next also moves to fill the vacated photosites.

Operation

Figure 4A:
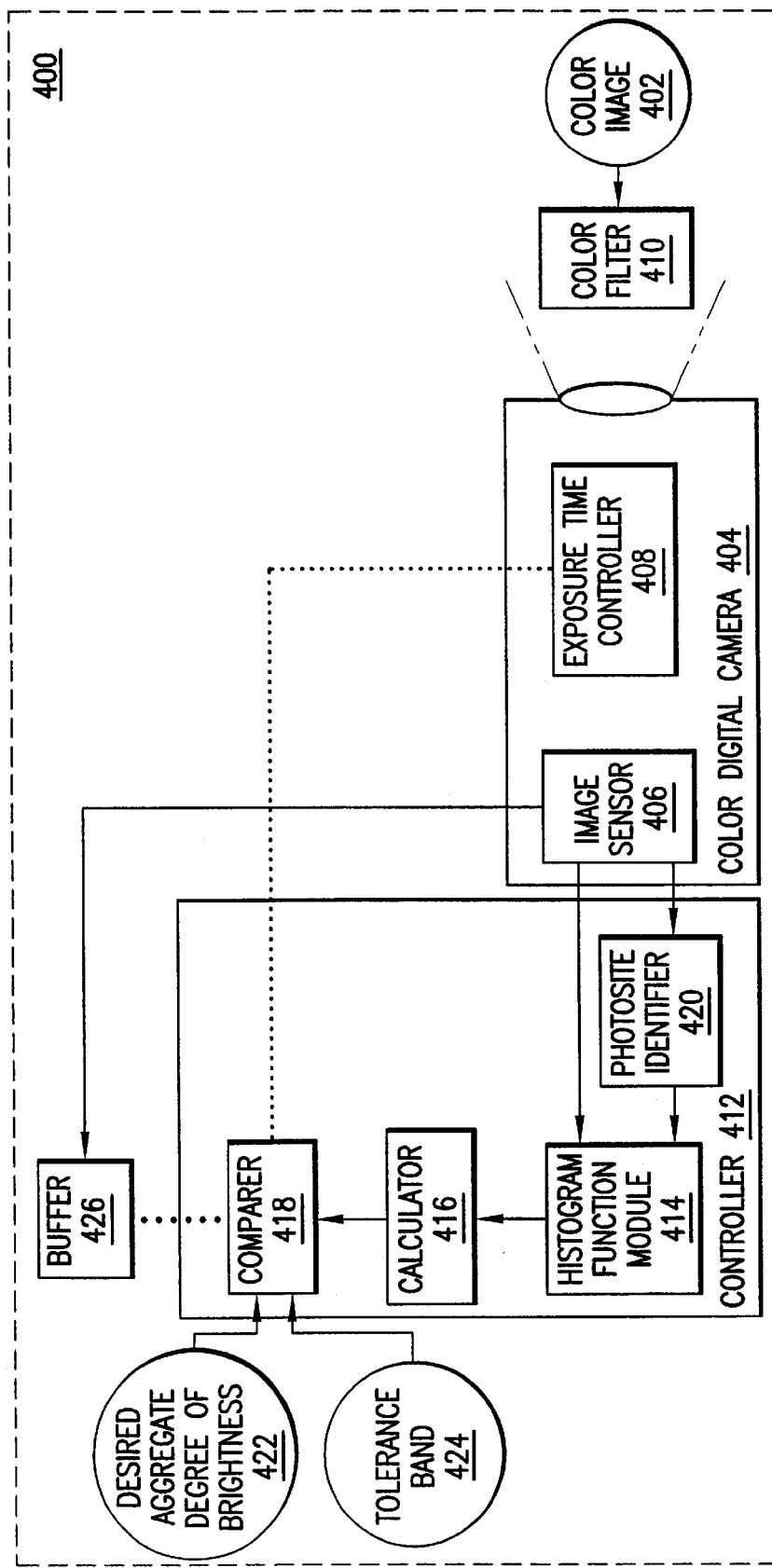
FIGS. 4A and 4B are block diagrams of a system for preferred embodiments of the present invention.
Figure 4B:
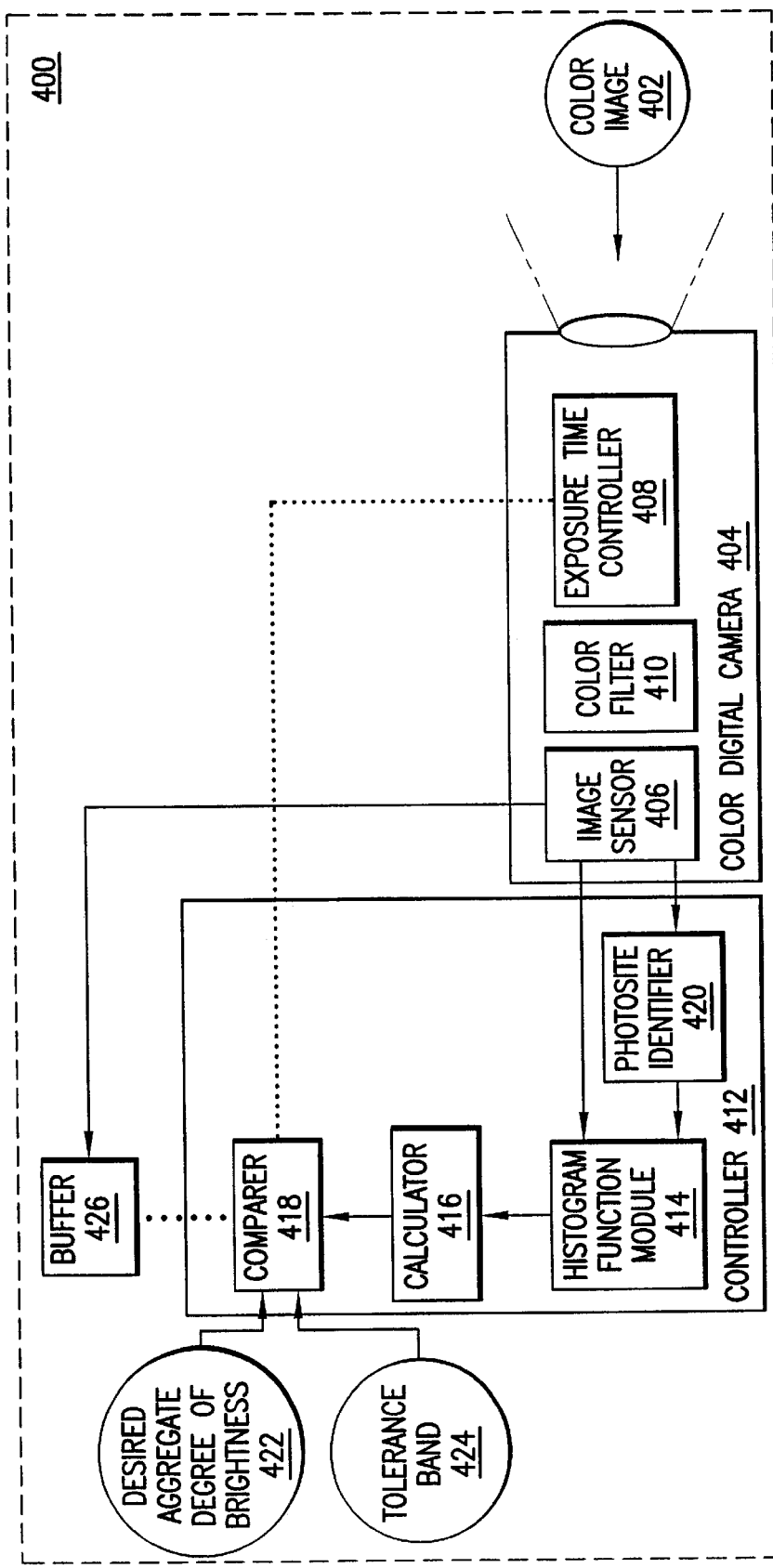
Figure 5:
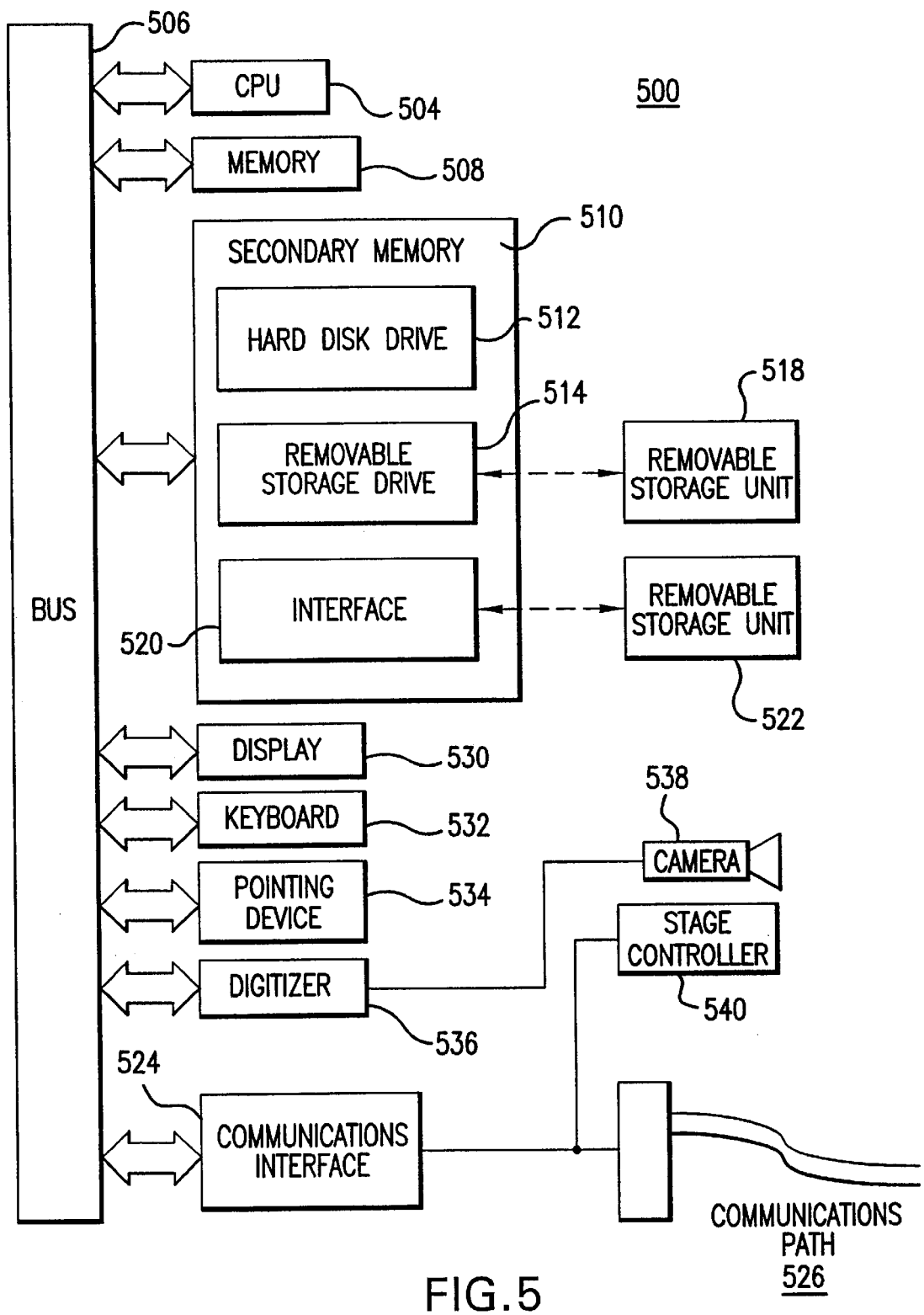
FIG. 5 is a block diagram illustrating an example environment in which the present invention can operate.

The present invention will now be described by referencing operational flow diagrams shown in FIGS. 1, 2, and 3. FIGS. 4A and 4B are a block diagrams of a system for preferred embodiments of the present invention. FIG. 5 is a block diagram illustrating an example environment in which the present invention can operate.

Figure 2:
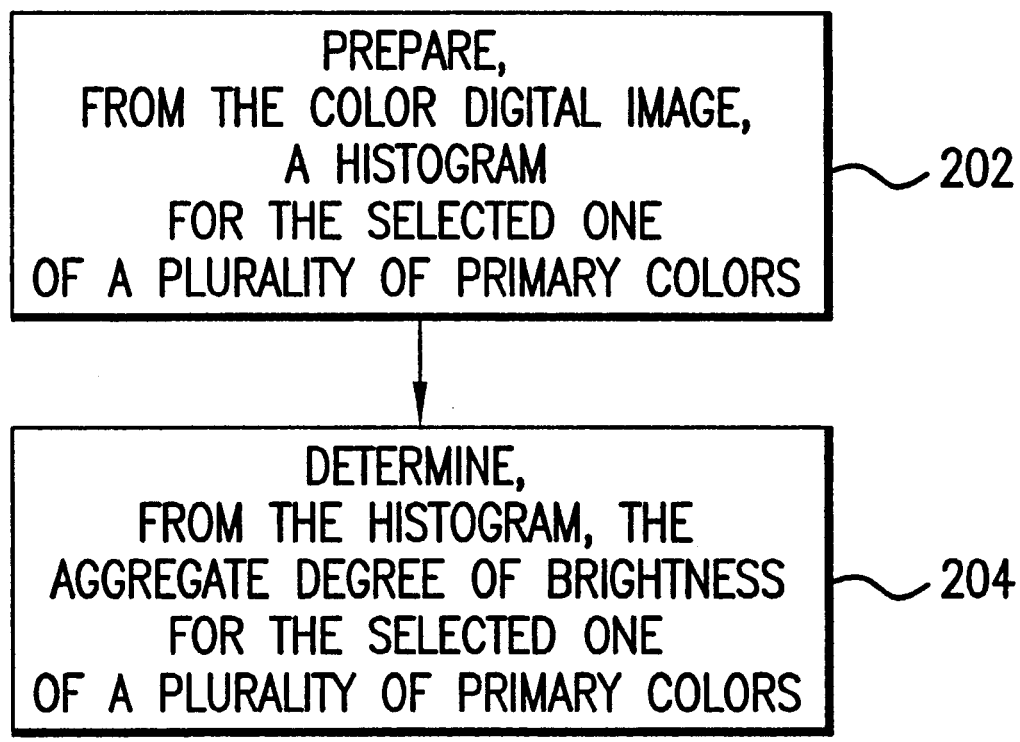
FIG. 2 is an operational block diagram of the process by which the aggregate degree of brightness for the selected primary color is determined.

FIG. 1 shows a high level operational block diagram of a preferred embodiment of the present invention. The present invention is designed to function with different types of color digital cameras. Color digital cameras can be designed to use one or more image sensors and a variety of filtering mechanisms and configurations. Furthermore, image sensors can be fabricated using different technologies. To create a composite color digital image in which the aggregate degree of brightness for each primary color is set to a desired level, the present invention processes each color individually. Therefore, the present invention takes a series of exposures in order to capture all of the colors. This is done even where, as in a preferred embodiment using a CoolSNAP™-Pro Digital Camera, the filtering configuration captures all of the colors with each exposure.

In FIG. 1, at a step 102, one of a plurality of primary colors is selected. Because all of the colors of visible light can be realized through various combinations of the three primary colors of red, green, and blue, it is possible, by using filters set to these three primary colors, to capture the various hues of an image and reproduce the actual coloring of the scene by reassembling the various filtered components. By controlling the degree of brightness for each of the primary colors, the present invention can control the degree of brightness of any color in the created composite color digital image.

In FIG. 1, at a step 104, a color digital image is captured with a color digital camera. The color digital camera can have one or a plurality of image sensors. The image sensors can use charge-coupled device (CCD) technology or complementary metal oxide semiconductor (CMOS) technology. One skilled in the art will recognize that other technologies may be developed that can also be used for image sensors. Hence, the present invention should not be limited to CCD and CMOS technologies. Where the color digital camera has one image sensor, different filtering methods determine whether all primary colors can be captured in a single exposure or whether each color must be captured in an independent exposure. One skilled in the art will recognize that there are numerous means by which filtering can be accomplished. Therefore, the present invention should not be limited to the filtering methods described.

If filtering is accomplished by use of individual filters affixed to and covering each photosite on the image sensor, all primary colors can be captured in a single exposure. These type of filters are formed in patterns such that the overall image sensor appears as a mosaic. The pattern used in Bayer mosaic filters is a typical arrangement. Although the use of individual filters affixed to and covering each photosite on the image sensor allows all primary colors to be captured in a single exposure, the present invention processes each color individually. Therefore, even in this case, the present invention takes a series of exposures to capture all of the colors.

Alternatively, filtering can be accomplished by use of filters that cover the entire image sensor. In this case, each color is captured individually. A series of exposures is taken in order to capture all of the colors. These filters can be individual color filters or a composite unit that can be controlled to filter different colors. Composite filters can be made using liquid crystal display technology.

Where the color digital camera has a plurality of image sensors, for example, each image sensor is typically dedicated to recording a single color of the captured image. In this case, filtering is accomplished by use of individual color filters that cover a corresponding image sensor.

In a preferred embodiment, the present invention uses a CoolSNAP™-Pro Digital Camera. The CoolSNAP™-Pro Digital Camera is an integrated package that includes cabling, interface boards, and control software configured for use as a single system with the color digital camera. The color digital camera includes a single image sensor with CCD photosites and a Bayer mosaic filter. The camera unit includes an exposure time controller, an analog-to-digital converter, and a processor.

Turning back to FIG. 1, at a step 106, the aggregate degree of brightness for the selected primary color is determined. FIG. 2 includes an operational block diagram of the process by which the aggregate degree of brightness for the selected primary color is determined, but one skilled in the art will recognize that there are other ways in which one can determine the aggregate degree of brightness for the selected primary color. In FIG. 2, at a step 202, a histogram of the values stored in those photosites corresponding to the selected primary color is prepared. Where filtering is accomplished by use of individual filters affixed to and covering each photosite on the image sensor, those photosites corresponding to the selected primary color can be identified by the pattern of the filter. The histogram is prepared using only the values stored in the identified photosites. Otherwise, where filtering is accomplished by use of filters that cover the entire image sensor, all photosites are used to capture each color. In this case, the histogram is prepared using the values stored in all the photosites. At a step 204, the aggregate degree of brightness for the selected primary color is determined using the distribution presented in the prepared histogram.

In FIG. 1, at a step 108, the determined aggregate degree of brightness for the selected primary color is compared with the desired degree of brightness for the selected primary color. If the determined aggregate degree of brightness for the selected primary color is not within the tolerance band surrounding the desired degree of brightness for the selected primary color, then an adjustment is made to the exposure time controller of the color digital camera, as illustrated at a step 110. If the determined aggregate degree of brightness for the selected primary color is within the tolerance band surrounding the desired degree of brightness for the selected primary color, then photosite values for the selected primary color are copied into corresponding pixels in the buffer, as illustrated at a step 114.

In FIG. 1, at a step 110, the exposure time controller of the color digital camera is adjusted. As the exposure time is increased, greater amounts of light energy are allowed to enter the color digital camera. Conversely, as the exposure time is decreased, lesser amounts of light energy are allowed to enter the color digital camera. One skilled in the art will recognize that there are other means by which the amount of light energy entering the color digital camera can be measured and controlled. Therefore, the present invention should not be limited to the described adjustable exposure time controller.

Figure 3:
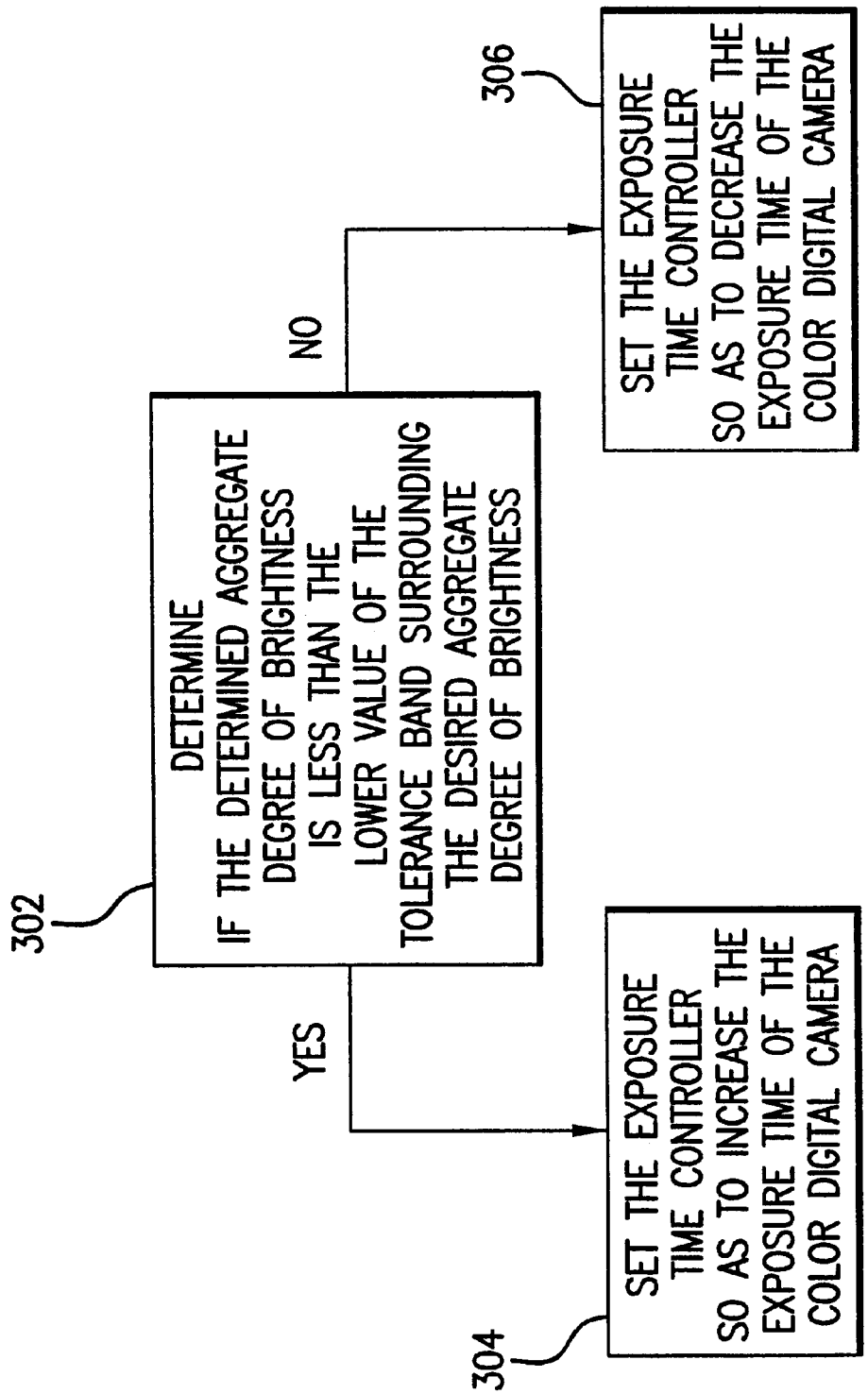
FIG. 3 is an operational block diagram of the process by which the setpoint of the metering cell of the color digital camera is adjusted.

FIG. 3 includes an operational block diagram of the process by which the exposure time controller of the color digital camera is adjusted, but one skilled in the art will recognize that there are other ways in which one can adjust the exposure time controller of the color digital camera without departing from the spirit and scope of the present invention. In FIG. 3, at a step 302, it is determined if the determined aggregate degree of brightness for the selected primary color is less than the lower value of the tolerance band surrounding the desired aggregate degree of brightness for the selected primary color. If the determined aggregate degree of brightness for the selected primary color is less than the lower value of the tolerance band surrounding the desired aggregate degree of brightness for the selected primary color, then the exposure time controller of the color digital camera is set so as to increase the exposure time of the color digital camera, as illustrated at a step 304. If the determined aggregate degree of brightness for the selected primary color is not less than the lower value of the tolerance band surrounding the desired aggregate degree of brightness for the selected primary color, then the exposure time controller of the color digital camera is set so as to decrease the exposure time of the color digital camera, as illustrated at a step 306.

The present invention enables the user to record an aggregate degree of brightness for the selected primary color that is different from the actual aggregate degree of brightness for the selected primary color of the objects in the image being captured. Light energy entering the color digital camera impinges on the image sensor causing the semiconductor material to release electrons that are captured by the photosites. In this way, each photosite records, as an electric charge, the accumulation of light energy that impinges on it. As a photosite is exposed to light for longer periods, increasing amounts of light energy reach it, and a greater electric charge is stored. When the recorded image is reproduced, this greater electric charge is rendered as a more intense level of brightness at the pixel corresponding to the photosite. In a converse manner, if a photosite is exposed to light for a shorter period, a decreased amount of light energy reaches it, and a lesser electric charge is stored. On the reproduced image, this lesser electric charge is rendered as a less intense level of brightness at the pixel corresponding to the photosite. Degree of brightness is proportional to exposure time.

In FIG. 1, at a step 112, the method of steps 104 through 110 is repeated until the determined aggregate degree of brightness for the selected primary color is within the tolerance band surrounding the desired degree of brightness for the selected primary color.

In FIG. 1, at a step 114, photosite values for the selected primary color are copied into corresponding pixels in the buffer. For each selected primary color, the photosite values are copied into those bits, within each pixel, reserved for the selected primary color.

In FIG. 1, at a step 116, the method of steps 102 through 114 is repeated for each remaining primary color, thereby creating a composite color digital image in which the aggregate degree of brightness for each primary color is set to a desired level.

FIGS. 4A and 4B are block diagrams of a system 400 for preferred embodiments of the present invention. The transfer of data within system 400 will be described in reference to the method of a preferred embodiment as presented above. One skilled in the art will recognize that there are other systems which can execute the processes of the present invention. Therefore, system embodiments of the present invention should not be limited to the system presented below.

In both FIGS. 4A and 4B, a color image 402 is captured by a color digital camera 404. The color digital camera 404 includes one or more image sensors 406 (only one image sensor 406 is shown on both FIG. 4A and 4B), and an adjustable exposure time controller 408. The adjustable exposure time controller 408 determines the amount of light that enters the color digital camera 404 for a specific exposure. The image sensors 406 can use CCD or CMOS technology. One skilled in the art will recognize that other technologies may be developed that can also be used for image sensors 406.

The color digital image 402 is filtered by a color filter 410 to extract a selected primary color. In FIG.4A, the color filter 410 can be an individual color filter from a set of color filters, with one color filter for each primary color. Alternatively, in FIG. 4A, the color filter 410 can be a composite unit that can be controlled to filter different colors. Composite filters can be made using liquid crystal display technology. In FIG. 4B, the color filter 410 is an integral part of the color digital camera 404. Color filter 410 can be a collection of individual color filters, each of which is affixed to and covers a photosite. These types of filters are formed in patterns such that the overall image sensor 406 appears as a mosaic. The pattern used in Bayer mosaic filters is a typical arrangement. Alternatively, where color digital camera 404 has more than one image sensor 406, color filter 410 in FIG. 4B can be one of a set of an image sensor 406 and color filter 410 combinations, with one combination for each primary color. One skilled in the art will recognize that there are numerous means by which filtering can be accomplished. Therefore, the present invention should not be limited to the filtering systems described.

In both FIGS. 4A and 4B, a digital representation of a selected primary color in the color image 402 is transferred from photosites on an image sensor 406 to a controller 412. The controller 412 includes a histogram function module 414, a calculator 416, and a comparer 418. If, in an embodiment of the present invention, filtering is accomplished by use of individual filters each of which is affixed to and covers a photosite on the image sensor 406, then the controller 412 also includes a photosite identifier 420.

Within the controller 412, the digital representation of the selected primary color in the color image 402 is sent to the histogram function module 414. The histogram function module 414 prepares a histogram, for the selected primary color, by plotting the number of photosites storing a particular value against the range of all values stored on the photosites. If, in an embodiment of the present invention, filtering is accomplished by use of individual filters each of which is affixed to and covers a photosite on the image sensor 406, then the histogram function module 414 also receives information from a photosite identifier 420 identifying which photosites on the image sensor 406 correspond to the selected primary color. Otherwise, the histogram is prepared using the values stored in all of the photosites on the image sensor 406.

The histogram is sent to a calculator 416 which determines an aggregate degree of brightness for the selected primary color. The determined aggregate degree of brightness is received by a comparer 418. Comparer 418 also receives, for the selected primary color, a desired aggregate degree of brightness 422 and a tolerance band 424. Values for the tolerance band 424 surround the desired aggregate degree of brightness 422 such that the desired aggregate degree of brightness 422 is at the centerpoint of the tolerance band 424. If the determined aggregate degree of brightness for the selected primary color is within the tolerance band 424 surrounding the desired aggregate degree of brightness for the selected primary color 422, then photosite values for the selected primary color are copied into corresponding pixels in a buffer 426. If the determined aggregate degree of brightness for the selected primary color is not within the tolerance band 424 surrounding the desired degree of brightness for the selected primary color 422, then an adjustment is made to the exposure time controller 408. The exposure time controller 408 adjusts the amount of light that enters the color digital camera 404 so that another color image 402 can be captured by the color digital camera 404.

Environment of the Invention

FIG. 5 is a block diagram illustrating an example environment in which the present invention can operate. The environment is a computer system 500 that includes one or more processors, such as a central processing unit (CPU) 504. The CPU 504 is connected to a communications bus 506. Various software embodiments are described in terms of this example computer system. After reading this description, it will be apparent to a person skilled in the relevant art how to implement the invention using other computer systems and/or computer architectures.

Computer system 500 also includes a main memory 508, preferably random access memory (RAM), and can also include a secondary memory 510. The secondary memory 510 can include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well known manner. Removable storage unit 518 represents a floppy disk, magnetic tape, optical disk, etc., which is read by and written to by removable storage drive 514. As will be appreciated, the removable storage unit 518 includes a computer usable storage medium having stored therein computer software and/or data.

The computer system 500 also includes conventional hardware such as a display 530, a keyboard 532, and a pointing device 534. A digitizer 536 and a camera 538 can be used for capturing images to process according to the present invention. Alternatively, images can be retrieved for processing according to the present invention from any of the above-mentioned memory units, or via a communications interface 524.

In alternative embodiments, secondary memory 510 may include other similar means for allowing computer programs or other instructions to be loaded into computer system 500. Such means can include, for example, a removable storage unit 522 and an interface 520. Examples can include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

The communications interface 524 allows software and data to be transferred between computer system 500 and external devices via communications path 526. Examples of communications interface 524 can include a modem, a network interface (such as an Ethernet card), a communications port (e.g., RS-232), etc. Software and data transferred via communications interface 524 are in the form of signals which can be electronic, electromagnetic, optical or other signals capable of being received by communications interface 524 via communications path 526. Note that communications interface 524 provides a means by which computer system 500 can interface to a network such as the Internet. According to a preferred embodiment of the present invention, the communications interface 524 can send control signals to the color digital camera and data from the color digital camera can be transferred back to the computer system 500. This interface can be parallel, serial, bi- or unidirectional.

The present invention is described in terms of this example environment. Description in these terms is provided for convenience only. It is not intended that the invention be limited to application in this example environment. In fact, after reading the complete description, it will become apparent to a person skilled in the relevant art how to implement the invention in alternative environments.

Software and Hardware Embodiments

The present invention is preferably implemented using software running (that is, executing) in an environment similar to that described above with respect to FIG. 5. In this document, the term "computer program product" is used to generally refer to removable storage device 518 or a hard disk installed in hard disk drive 512. These computer program products are means for providing software to computer system 500.

Computer programs (also called computer control logic) are stored in main memory and/or secondary memory 510. Computer programs can also be received via communications interface 524. Such computer programs, when executed, enable the computer system 500 to perform the features of the present invention as discussed herein. In particular, the computer programs, when executed, enable the processor 504 to perform the features of the present invention. Accordingly, such computer programs represent controllers of the computer system 500.

In an embodiment where the invention is implemented using software, the software may be stored in a computer program product and loaded into computer system 500 using removable storage drive 514, hard drive 512 or communications interface 524. Alternatively, the computer program product may be downloaded to computer system 500 over communications path 526. The control logic (software), when executed by the processor 504, causes the processor 504 to perform the functions of the invention as described herein.

In another embodiment, the invention is implemented primarily in hardware using, for example, hardware components such as application specific integrated circuits (ASICs). Implementation of a hardware state machine so as to perform the functions described herein will be apparent to persons skilled in the relevant art(s).

Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A method for creating a composite color digital image wherein, for each primary color, an aggregate degree of brightness can be set within a tolerance band surrounding a desired aggregate degree of brightness, comprising:

(a) selecting one of a plurality of primary colors;

(b) capturing a color digital image with a color digital camera;

(c) determining the aggregate degree of brightness for the selected one of the plurality of primary colors in the color digital image;

(d) copying photosite values, for the selected one of the plurality of primary colors, into corresponding pixels in a buffer; and (e) repeating the method for each remaining primary color, thereby creating the composite color digital image wherein, for each primary color, the aggregate degree of brightness is within the tolerance band surrounding the desired aggregate degree of brightness.

2. The method according to claim 1, wherein said determining further comprises:

(a) preparing, from the color digital image, a histogram for the selected one of the plurality of primary colors; and (b) determining, from the histogram, the aggregate degree of brightness for the selected one of the plurality of primary colors.

3. The method according to claim 1, further comprising, between said determining and said copying:

(a) comparing said determined aggregate degree of brightness, for the selected one of the plurality of primary colors, with the desired aggregate degree of brightness for the selected one of the plurality of primary colors;

(b) adjusting an exposure time controller of the color digital camera if a result of said comparing reveals that said determined aggregate degree of brightness, for the selected one of the plurality of primary colors, is not within the tolerance band surrounding the desired aggregate degree of brightness, for the selected one of the plurality of primary colors; and (c) reiterating said capturing, said determining, said comparing, and said adjusting if the result of said comparing reveals that said determined aggregate degree of brightness, for the selected one of the plurality of primary colors, is not within the tolerance band surrounding the desired aggregate degree of brightness, for the selected one of the plurality of primary colors.

4. The method according to claim 3, wherein, if the result of said comparing reveals that said determined aggregate degree of brightness, for the selected one of the plurality of primary colors, is greater than an upper value of the tolerance band surrounding the desired aggregate degree of brightness, for the selected one of the plurality of primary colors, said adjusting further comprises setting the exposure time controller so as to decrease an exposure time of the color digital camera.

5. The method according to claim 3, wherein, if the result of said comparing reveals that said determined aggregate degree of brightness, for the selected one of the plurality of primary colors, is less than a lower value of the tolerance band surrounding the desired aggregate degree of brightness, for the selected one of the plurality of primary colors, said adjusting further comprises setting the exposure time controller so as to increase an exposure time of the color digital camera.

6. The method according to claim 1, wherein the color digital camera has a single image sensor.

7. The method according to claim 1, wherein the color digital camera has a plurality of image sensors.

8. The method according to claim 1, wherein an image sensor, of the color digital camera, uses a charge-coupled device technology.

9. The method according to claim 1, wherein an image sensor, of the color digital camera, uses a complementary metal oxide semiconductor technology.

10. The method according to claim 1, wherein a color filter, of the color digital camera, is a pattern of individual filters, each of the individual filters affixed to and covering a photosite on an image sensor.

11. The method according to claim 10, wherein the pattern of individual filters is a Bayer mosaic filter.

12. The method according to claim 1, wherein a color filter, of the color digital camera, is a collection of individual filters such that each of the individual filters is capable of covering an image sensor.

13. The method according to claim 1, wherein a color filter, of the color digital camera, is a composite filter unit that can be controlled to filter different colors and that is capable of covering an image sensor.

14. The method according to claim 13, wherein the composite filter unit uses a liquid crystal display technology.

15. A system for creating a composite color digital image using a color digital camera, comprising:

a controller to set a desired aggregate degree of brightness for at least one of a plurality of primary colors;

one or more color filters to filter an image according to each of said primary colors; and a buffer to store photosite values for each of said primary colors into corresponding pixels of said buffer, thereby creating the composite color digital image.

16. The system according to claim 15, wherein said controller manually sets the desired aggregate degree of brightness for at least one of said plurality of primary colors.

17. The system according to claim 15, wherein said controller automatically sets the desired aggregate degree of brightness for at least one of said plurality of primary colors.

18. The system according to claim 15, wherein the color digital camera uses an exposure time controller to control exposure time.

19. The system according to claim 18, wherein said controller adjusts said exposure time controller.

20. The system according to claim 19, wherein said controller further comprises:

a histogram function module to prepare a histogram of said photosite values for each of said primary colors;

a calculator to determine an aggregate degree of brightness for each of said primary colors; and a comparer to compare said determined aggregate degree of brightness for each of said primary colors with a corresponding said desired aggregate degree of brightness for each of said primary colors.

21. The system according to claim 20, wherein said comparer receives, manually or automatically, said desired aggregate degree of brightness for each of said primary colors and a corresponding tolerance band for each of said primary colors.

22. The system according to claim 20, wherein said controller further comprises a photosite identifier to identify which photosites on one or more image sensors correspond to each of said primary colors.

23. The system according to claim 15, wherein the color digital camera has a single image sensor.

24. The system according to claim 15, wherein the color digital camera has a plurality of image sensors.

25. The system according to claim 15, wherein the color filter is a pattern of individual filters, each of the individual filters affixed to and covering a photosite on an image sensor.

26. The system according to claim 25, wherein the pattern of individual filters is a Bayer mosaic filter.

27. The system according to claim 15, wherein the color filter is a collection of individual filters such that each of the individual filters is capable of covering an image sensor.

28. The system according to claim 15, wherein the color filter is a composite filter unit that can be controlled to filter different colors and that is capable of covering an image sensor.

29. The system according to claim 28, wherein the composite filter unit uses a liquid crystal display technology.

* * * * *